United States Patent [19]

Motegi et al.

[11] Patent Number: 4,937,795

[45] Date of Patent: Jun. 26, 1990

[54] ACCESS ALARMING METHOD AND APPARATUS FOR WORKING VEHICLE

[75] Inventors: Ryohei Motegi, Hiratsuka; Yoichi Hirokawa, Kamakura; Yukio Yoshida, Yokohama; Junichi Furuki, Tokyo; Tetsuya Ishii, Narashino; Isao Takiguchi, Tokyo; Hiroshi Kono, Urawa; Takehiko Suyama, Ayase; Tomohiro Gocho, Ibaraki; Satohiko Tanaka, Matsudo; Narimasa Yamabe, Saitama; Yoshimitsu Hashimoto, Higashimurayama, all of Japan

[73] Assignee: Tokyo Keiki Co., Ltd., Tokyo, Japan

[21] Appl. No.: 215,554

[22] Filed: Jul. 5, 1988

[30] Foreign Application Priority Data

Jul. 6, 1987 [JP] Japan .................................. 62-168306
Jul. 7, 1987 [JP] Japan .................................. 62-169554
Jun. 25, 1988 [JP] Japan .............................. 63-84092[U]
Jun. 25, 1988 [JP] Japan .............................. 63-84093[U]

[51] Int. Cl.$^5$ ............................................. G01S 9/66
[52] U.S. Cl. ..................................... 367/93; 340/903; 340/539
[58] Field of Search ................................ 367/93, 94; 340/901–905, 321, 539

[56] References Cited

U.S. PATENT DOCUMENTS

| 3,806,861 | 4/1974 | Okumura et al. | 340/1 R |
| 3,868,573 | 2/1975 | Holcomb | 340/539 |
| 3,942,601 | 3/1976 | Smith | 367/93 |
| 3,947,832 | 3/1976 | Rosgen | 340/539 |
| 4,026,654 | 5/1977 | Beaurian | 340/903 |
| 4,100,529 | 7/1978 | Evans | 340/901 |
| 4,623,032 | 11/1986 | Kemmer | 307/525 |

Primary Examiner—Michael J. Tokar
Attorney, Agent, or Firm—Sandler & Greenblum

[57] ABSTRACT

An access alarming method and apparatus for activating an alarm in the event of the access of a working vehicle, such as a road roller, to an object, such as a worker, in the same working area as the vehicle. An ultrasonic wave transmitted by a transmitter on the object is received by a receiver on the vehicle. The received signal is processed and used to determine the relative position of the vehicle with respect to the object. An alarm is activated, and/or the vehicle is braked when it is judged that the object is within a hazard area determined in relation to the position and course of the vehicle.

19 Claims, 18 Drawing Sheets

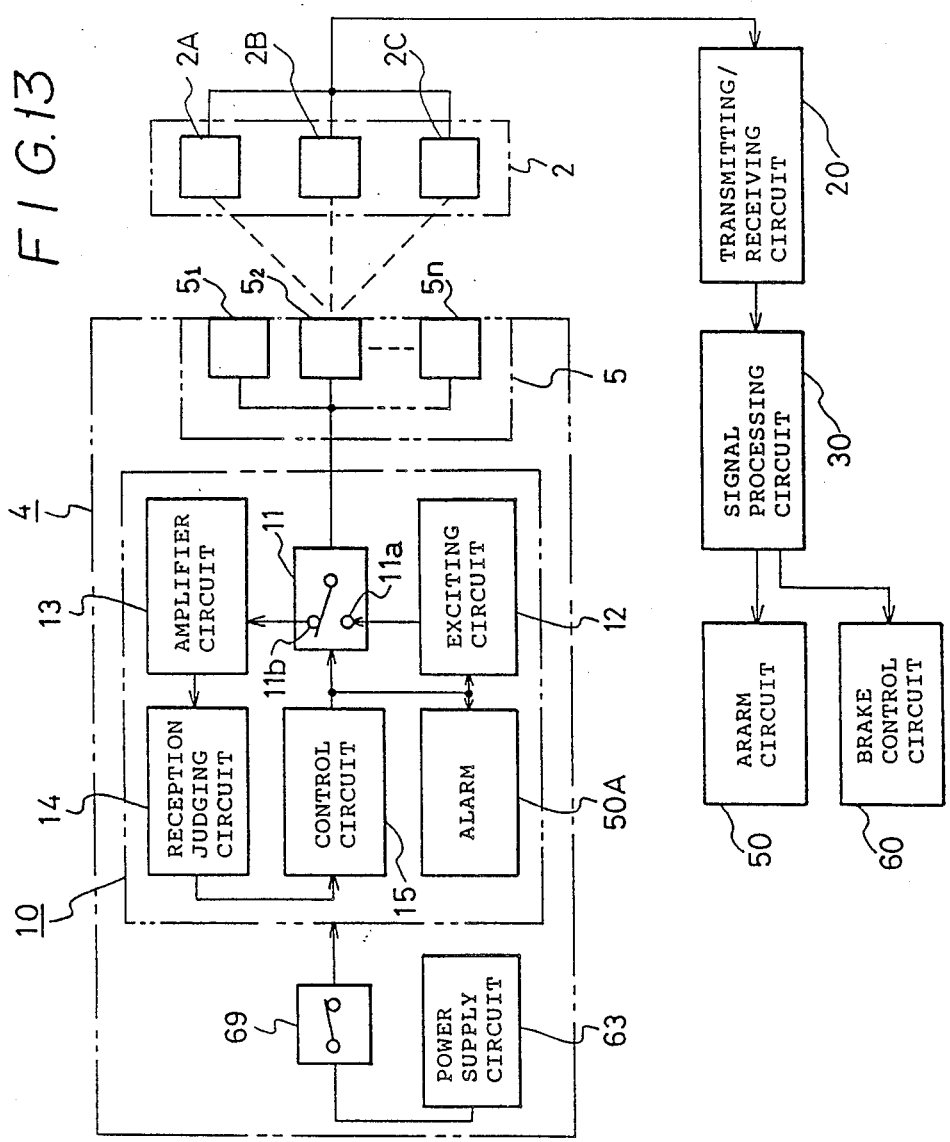

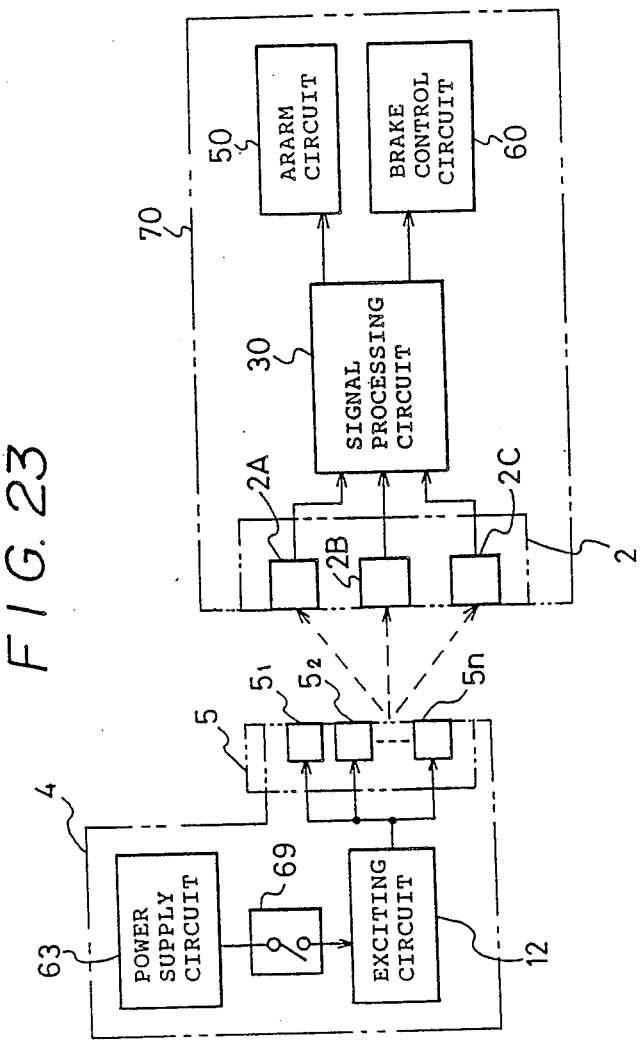

ACCESS ALARMING METHOD AND APPARATUS FOR WORKING VEHICLE

BACKGROUND OF THE INVENTION

1. Field of the Invention

The present invention relates to a method of and an apparatus for generating an alarm in the event of access of a working vehicle to a worker working in the same working area as the vehicle. More particularly, the invention is concerned with a method of and an apparatus for detecting the position of a worker with respect to the working vehicle by making use of ultrasonic waves and for activating alarm, as necessary.

2. Related Art

Maintenance of an aircraft requires many large-size transporting vehicles for transporting various parts of the aircraft. These transporting vehicles travel in the area around the aircraft, which area contains many workers. Similarly, by road construction sites, construction machinery or vehicles, such as road rollers, work in areas where many workers work together. The operation of such vehicles involves a substantial danger that workers may accidentally be injured by contact with a vehicle, particularly when the vehicle is moving backwards. In order to eliminate such a danger, it has been a common measure to attach a device known as back sonar to a suitable portion of a vehicle. The back sonar serves as a safety device which, upon detection of an unidentified object which has accessed the vehicle, activates an alarm or automatically puts the brake of the vehicle into effect thereby stopping the vehicle.

Sensors such as back sonar, however, are disadvantageous in that they are sensitive to all the objects which reside in the area covered by the sensor, so that the vehicle may undesirably be stopped in response to detection of an object such as an electric pole or a fence, causing a serious impediment to the performance of the work.

In particular, in construction sites, workers are often obliged to work without taking into account the approach of working vehicles or without facing such vehicles at all for a long time. Thus, the workers often have to work without visually recognizing a vehicle, even when the vehicle is approaching. In fact, it often happens that a vehicle running backwards accidentally contacts a worker, who has not been aware of the access of the vehicle at all.

It is also to be pointed out that the sight of workers, particularly backward sight, is seriously impaired by helmets, which the workers are required to wear from the view point of safety.

This gives rise to the demand for a suitable measure for informing the worker of access of a working vehicle from the back side of the worker, thereby eliminating such danger.

The most practical and conventional method for avoiding such danger is to station a watcher who is in charge of watching the positions of workers in relation to moving vehicles. Obviously, however, the best method would be to enable each worker himself to be aware of access of any vehicle running therearound.

SUMMARY OF THE INVENTION

Accordingly, an object of the present invention is to provide a method of and an apparatus for transmitting a warning signal which is capable of operating, with a high degree of reliability, in such a manner as to activate, for example, an alarm circuit upon detection of an object such as a worker who is in a predetermined area of danger, thereby overcoming the problems of the prior art.

The position of a worker relative to a working vehicle momentarily changes. Also, the worker is obliged to wear a helmet or a vest. With these facts, the present invention makes it possible to accurately detect the position of a worker regardless of the momentary change in the relative position between the worker and the vehicle and produces warning or alarm as required to enable the worker to recognize dangerous access of the vehicle, while braking the vehicle to avoid danger, thereby to remarkably enhance safety.

To this end, according to one aspect of the present invention, there is provided an alarm method for a working vehicle, wherein an ultrasonic signal transmitted from an object is received by a receiver on the vehicle and suitably processed by a processing device on the vehicle so as to produce necessary alarm, wherein the alarm is produced when the object has come into a predetermined area of danger relative to the working vehicle. According to another aspect of the present invention, there is provided an apparatus for transmitting warning comprising: supersonic wave transmitting/receiving means mounted on an object, processing means for determining relative position between a working vehicle and the object upon receipt of a signal from the supersonic transmitting/receiving means, and an alarm circuit capable of operating on condition that the object has come into a predetrmined area of danger relative to the working vehicle.

BRIEF DESCRIPTION OF THE DRAWINGS

FIG. 13 is a block diagram of a third embodiment;

FIG. 22(2) is an illustration of the state of operation of the arrangement shown in FIG. 22(1); and FIGS. 23 and 24 are illustrations of modifications of the embodiments of the invention.

DETAILED DESCRIPTION OF THE PREFERRED EMBODIMENTS

Preferred embodiments of the present invention will be described with reference to the accompanying drawings.

Figure 1:
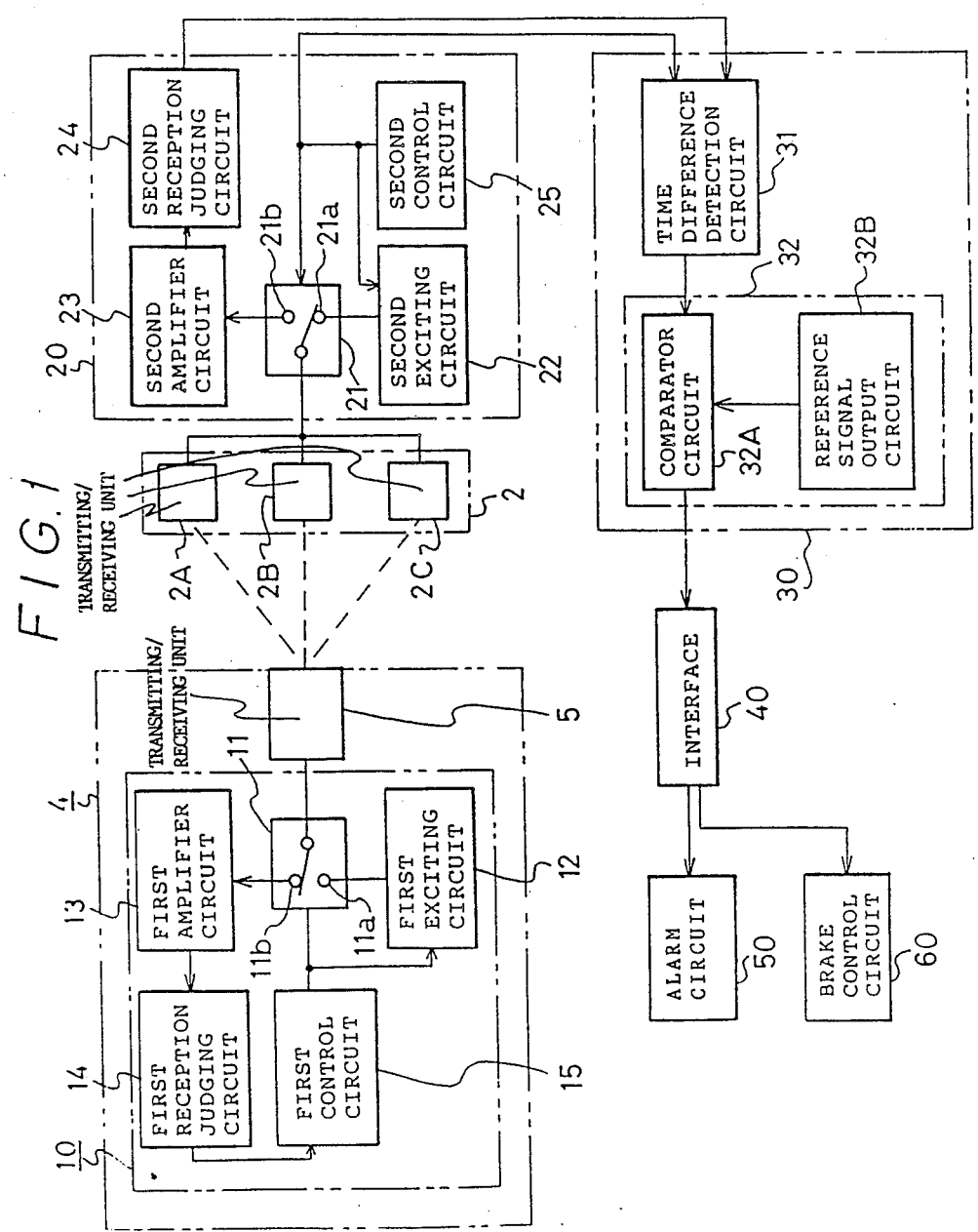
FIG. 1 is a block diagram of a first embodiment of the present invention.
Figure 2:
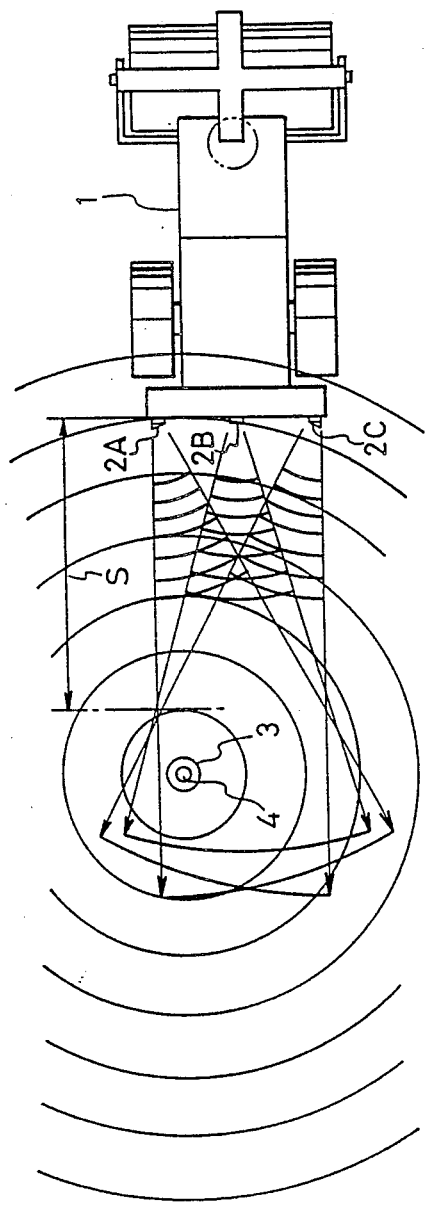
FIG. 2 is an illustration of the relative position between an object and three supersonic wave transmitting/receiving units of the type used in the embodiment shown in FIG. 1.

Referring first to FIGS. 1 and 2, a first embodiment of the present invention has a searching supersonic wave transmitting/receiving device 2 installed on a working vehicle 1 and adapted for producing searching supersonic wave, and response supersonic wave transmitting/receiving device 4 provided on an object 3 and operative in response to the searching supersonic wave from the searching supersonic wave trasnmitting/receiving device 2 so as to transmit a response supersonic wave of a frequency different from the frequency of the searching supersonic wave. In this embodiment, a helmet which is necessarily worn by each worker is used as the object 3. The response supersonic wave transmitting/receiving device 4 is constituted by a wide-band supersonic wave transmitting/receiving unit 5 and a first transmitting/receiving circuit 10 which is annexed to the supersonic transmitting/receiving unit 5. The first transmitting/receiving circuit 10 includes a first change-over circuit 11, a first exciting circuit 12 connected to one 11a of terminals of the change-over circuit 11 and designed to be driven through a power supply circuit (not shown), a first amplifier circuit 13 and a first reception judging circuit 14 which are connected in series to the other terminal 11b of the change-over circuit 11, and a first control circuit 15 which is adapted to be energized by the first reception judging circuit 14 so as to switch the change-over circuit 11 from a state in which it is connected to the first exciting circuit to a state in which it is connected to the first amplifier circuit 13 and, at the same time, to deliver a trigger signal to the first exciting circuit to activate and control the first exciting circuit 12.

The first reception judging circuit 14 is adapted to operate without delay when the supersonic wave from the searching supersonic wave transmitting/receiving unit 2 is received by the response supersonic transmitting/receiving unit 5, so as to deliver a predetermined operation instruction signal to the first control circuit 15. The first exciting circuit 12 is adapted to output an exciting signal of a frequency different from the frequency of the searching supersonic wave from the searching supersonic wave transmitting/receiving unit 2 so as to enable the response supersonic wave transmitting/receiving unit 2 to transmit supersonic wave of the frequency difeent from that of the searching supersonic wave.

The searching supersonic wave transmitting/receiving unit 2 incorporated in this embodiment is composed of three supersonic wave transmitting/receiving units 2A, 2B and 2C. As shown in FIG. 2, these three supersonic wave transmitting/receiving units 2A, 2B and 2C are arranged on one side of the working vehicle at the same height and at a constant interval. Among these three supersonic wave transmitting/receiving units, the units 2A and 2C on both sides are inwardly directed such that the outer boundaries of the areas of their directivities extend substantially in parallel with the direction of running of the working vehicle which is in this case a road roller 1. These three supersonic wave transmitting/receiving units 2A, 2B and 2C are adapted to be driven in a parallel fashion by means of a second transmitting/receiving circuit 20.

The second transmitting/receiving circuit 20 includes a second change-over circuit 21, a second exciting circuit 22 connected to one 21a of terminals of the second change-over circuit 21, a second amplifier circuit 23 and a second reception judging circuit 24 which are connected in series to the other 21b of the terminals of the second change-over circuit 21, and a second control circuit 25 which is adapted to switch the second change-over circuit 21 at a predetermined constant timing and to deliver a trigger signal to the second exciting circuit 22 so as to drive and control the second exciting circuit 22. A signal processing circuit 30 is connected to the output side of the second transmitting/receiving circuit 20.

The second exciting circuit 22 is so designed as to be able to output an exciting signal of a predetermined frequency for simultaneously driving three supersonic wave transmitting/receiving units 2A, 2B and 2C.

The second reception judging circuit 24 is adapted to operate in response to the supersonic wave signal which arrives for the first time at the second reception judging circuit 24, and is adapted to deliver predetermined computing pulse signals to the signal processing circuit 30. The switching of the second change-over circuit 21 is conducted by the second control circuit 25. More specifically, the switching of the change-over circuit 21 effects a change-over between transmission mode and receiving mode. The timing of the change-over, i.e., the time lengths of the transmission and receiving, is so determined as to cover an area of a distance which is, for example, twice as large as a predetermined distance S to a hazard. The signal output from the second control circuit 25 for commencing the transmission is delivered also to the signal processing circuit mentioned before.

The signal processing circuit 30 is composed of a time difference detection circuit 31 and a hazard judging circuit 32. The time difference detection circuit 31 has a function to measure the time from the moment at which the searching supersonic wave is output till the moment at which the response supersonic wave is received. More specifically, the time difference detection circuit 31 has a major part constituted by a counter circuit which is capable of counting clock pulses between a reset signal which is generated at the moment of rise or fall of an output signal of the second control circuit 25 and an end signal produced at the moment of rise or fall of the output signal from the second reception judging circuit 24. The time difference output from the time difference detection circuit is transmitted to the hazard judging circuit 32 which is designed to judge whether any object 3 exists within the hazard distance S. The hazard judging circuit 32 is constituted by a comparator circuit 32A and a reference signal output circuit 32B. When the time corresponding to the searching distance derived from the output of the time difference detection circuit 31 is smaller than the time corresponding to the hazard distance as set by the reference signal output circuit 32, the hazard judging circuit outputs a hazard signal without delay thereby activating, through an interface 40, an alarm circuit 50 and a brake control circuit 60 on the vehicle 1.

The operation of this embodiment is as follows.

The apparatus is put into operation in the state shown in FIG. 1. An exciting signal of a predetermined frequency output from the second exciting circuit 22 is delivered through the second change-over circuit 21 to the searching supersonic transmitting/receiving device 2 so that three supersonic transmitting/receiving units 2A, 2B and 2C are simultaneously activated in transmission mode to output searching supersonic waves concurrently as shown in FIG. 2. After elapse of a predetermined time, the state of the searching supersonic wave transmitting/receiving units 2A, 2B and 2C is switched to the receiving mode in which these units are capable of receiving supersonic waves.

Figure 3:
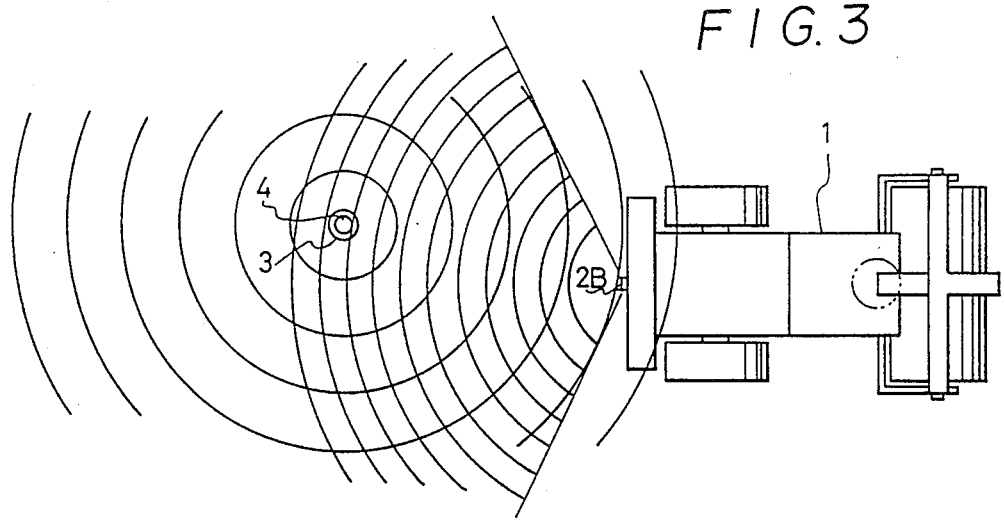
FIGS. 3 and 4 are illustrations of different embodiments of the present invention.
Figure 4:
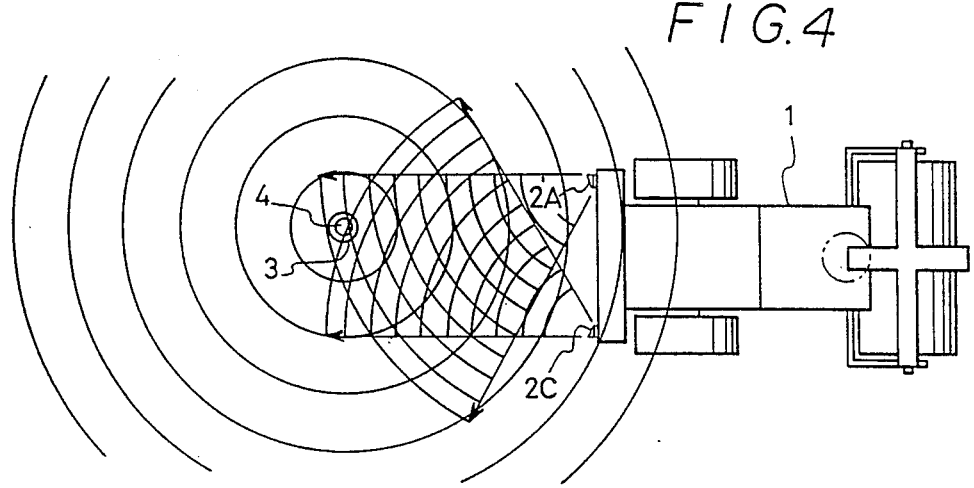

On the other hand, the response supersonic wave transmitting device 4 receives the searching supersonic wave almost concurrently with the switch-over of the state of the searching supersonic wave transmitting-/receiving units 2A, 2B and 2C. Immediately after the receipt of the searching supersonic wave, the first reception judging circuit 14 of the response supersonic wave transmitting/receiving device 4 produces and outputs an operation signal for activating the first control circuit 15. In response to this operation signal, the first control circuit 15 operates to switch the first change-over circuit 11 so as to connect the first exciting circuit 12 to the response supersonic wave transmitting-/receiving unit 5, so that the transmitting/receiving unit 5 transmits a response supersonic wave of a frequency different from the frequency of the searching supersonic wave. The response supersonic wave is detected by any one of the supersonic wave transmitting/receiving units 2A, 2B and 2C and is delivered to the second reception judging circuit 24 which confirms that the received supersonic wave is the response supersonic wave. Simultaneously, the second reception judging circuit 24 shapes the received signal and delivers the speed signal to the signal processing circuit 30. The signal processing circuit 30 then computes the time difference as explained before, thereby judging whether there is any object 3 within the hazard distance S. When an object 3 is found to reside within the hazard distance S, the signal processing circuit 30 operates to deliver a predetermined signal without delay through the interface 40, thereby activating the alarm circuit 50 and to effect braking control of the vehicle 1 by means of the brake control circuit 60. Although the searching supersonic wave transmitting/receiving device 2 in the described embodiment is composed of three supersonic transmitting/receiving units 2A, 2B and 2C, the searching supersonic wave transmitting/receiving device 2 may be composed of a single supersonic wave transmitting/receiving unit 2B as shown in FIG. 3. Similarly, the searching supersonic wave transmitting/receiving device 2 may be composed of a pair of supersonic wave transmitting/receiving units 2A and 2C as shown in FIG. 4.

In the embodiment described above, both the searching supersonic wave transmitting/receiving units 2A,2B,2C and the response supersonic wave transmitting/receiving unit 5 are capable of both transmitting and receiving supersonic waves over wide frequency bands. This arrangement, however, is only exclusive and the arrangement may be such that combinations of a transmitter and a receiver are provided on each of the vehicle 1 and the object 3.

In the embodiment as described, the searching supersonic wave transmitting/receiving device on the vehicle can receive a response supersonic wave of a frequency which is different from the frequency of the searching supersonic wave transmitted from the searching supersonic wave transmitting/receiving device. It is therefore possible to completely exclude any erroneous operation which may otherwise be caused by the searching supersonic wave reflected by other objects than the workers. In addition, the alarm is activated without delay whenever the object to be warned, i.e., a worker, has become located within the hazard distance. This completely eliminates inconveniences encountered with conventional apparatus, e.g., erroneous operation due to presence of electric poles or fences, and ensures safety of the workers thereby contributing to an improvement in the efficiency of the construction and other works. Thus, the present invention provides an access alarming method and apparatus for working vehicles which is much improved over the conventional methods and apparatus. A description will be made hereinafter as to a second embodiment of the present invention with specific reference to FIGS. 5 to 12. In the following description, the same reference numerals are used to denote the same parts or members as those in the first embodiment, and description and illustration are simplified with regard to these parts or members.

In this embodiment, the supersonic wave transmitting/receiving unit serving as the response supersonic wave transmitting/receiving device is attached to a vest worn by each worker. This supersonic wave transmitting/receiving unit continuously outputs supersonic waves which are received and processed by a suitable unit mounted on the vehicle, thereby detecting dangerous access of the vehicle. Referring to FIGS. 5 to 9, supersonic wave transmitting/receiving units 5a, 5b, . . . , 5g are provided on the back 61A, front 61B and shoulder portions of the vest 61. These supersonic wave transmitting/receiving units 5a, 5b, . . . , 5g are excited by an exciting circuit 12 which is driven by power from an electrical power supply circuit 63.

Figure 6:
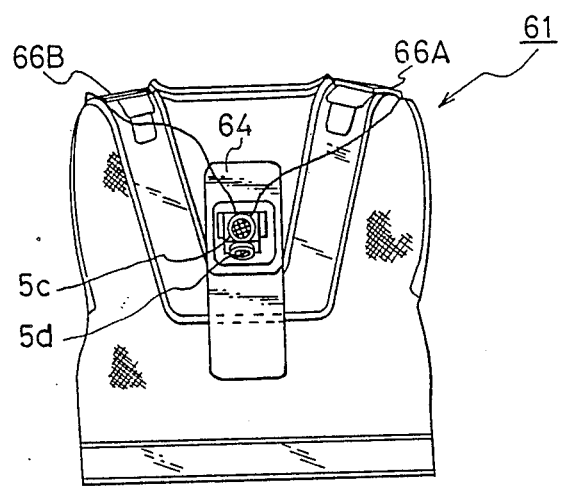
FIG. 6 is a rear elevational view of the embodiment shown in FIG. 5.

As shown in FIG. 6, a variable-position mounting means 64 constituted by, for example, an adhesive strap (registered trademark "magic tape") is disposed between each supersonic wave transmitting/receiving unit 5c to 5f and the vest 61.

A supersonic wave transmitting/receiving unit 5g is detachably secured to the breast portion of the vest 61, while supersonic wave transmitting/receiving units 5a, 5b are detachably secured to both shoulder portions of the vest.

Figure 5:
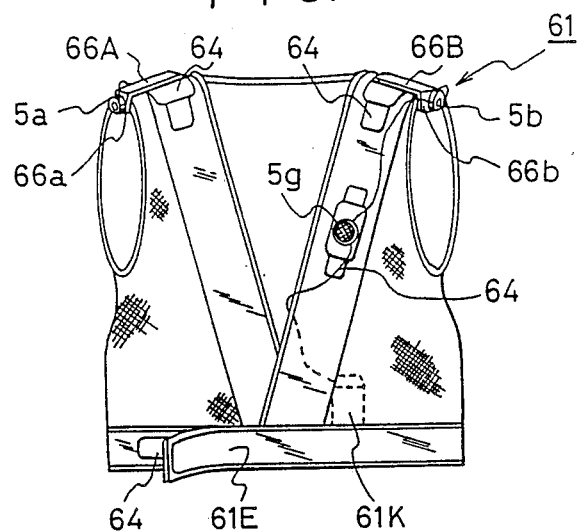
FIG. 5 is a front elevational view of a second embodiment.
Figure 7:
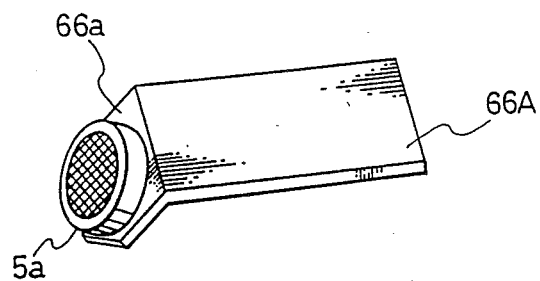
FIG. 7 is a perspective view of shoulder plates which are to be put on shoulders of a worker and which are provided with supersonic wave transmitting/receiving units.

As will be seen from FIGS. 5 and 7, these supersonic wave transmitting/receiving units 5a, 5b are secured to both shoulder portions through respective plates 66A and 66B. More specifically, these plates 66A and 66B are bent at their front portions and the supersonic wave transmitting/receiving units 5a, 5b are detachably secured to the bent portions 66a, 66b through pieces of an adhesive strap 64.

Supersonic wave transmitting/receiving units 5c to 5f are secured to the central portion of the back of the vest 61 through a base member 68 and a piece of adhesive strap 64. Among these supersonic wave transmitting/receiving units 5c to 5f, the supersonic wave transmitting/receiving unit 5c is secured to the base member 68 so as to be directed rearward. Another supersonic wave transmitting/receiving unit 5d is directed downward, while the remainder two supersonic wave transmitting/receiving units 5e and 5f are secured to the base member 68 so as to be directed to the left and right as will be best seen from FIG. 8.

The base member 68 is secured to the vest 61 through adhesive strap 64.

The adhesive strap 64 has a portion to be fixed to the vest 61. This portion has a considerable length in the vertical direction, so that the position of the base member 68 can be varied largely in the vertical direction so as to match the size of the worker who wears the vest. The heightwise position of the base member 68 also may be varied in accordance with the factors such as the size of the working area in which the vehicle runs and the speed of backward running of the vehicle. Furthermore, the aforementioned supersonic wave transmitting/receiving unit 5g is detachably secured to the vest 61 through the adhesive strap 64.

The vest 61 has a waist belt region 61E on its waist portion. An adhesive strap 64 is provided on the front portion of the waist belt region 61E. The worker P can take off the vest 61 by delaminating the adhesive strap 64, as shown in FIG. 5.

The exciting circuit 12 for exciting the supersonic wave transmitting/receiving units and the electric power supply circuit 63 (see FIG. 9) for driving the exciting circuit 12 are received in a case 61K together with a power supply switch 69. The case 61K is adapted to be detachably secured to any desired portion of the vest 61. In operation, all the supersonic wave transmitting/receiving units 5a to 5g start to emit supersonic waves as the exciting circuit 12 is activated in response to turning on of the power supply switch 69.

Figure 9:
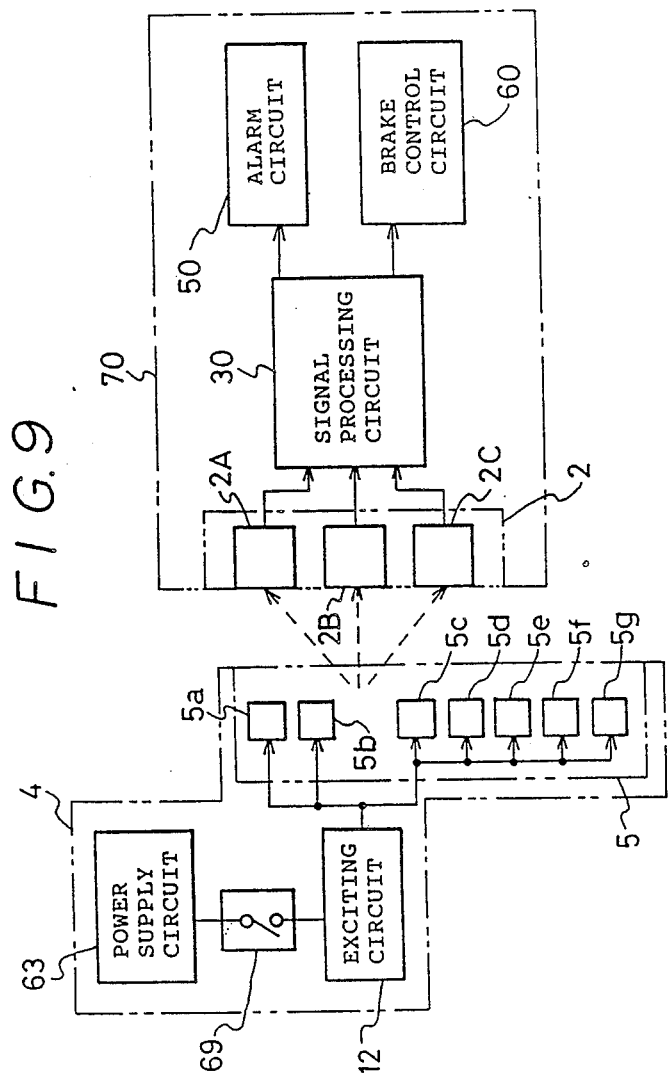
FIG. 9 is a block diagram of the whole circuit in the second embodiment.

The supersonic waves transmitted from one or more units on the worker P are received on receiving means provided on the vehicle 1. In this embodiment, the supersonic wave receiving means 70 provided on the working vehicle 1 have at least three supersonic wave transmitting/receiving units 2A, 2B and 2C. A signal processing circuit 30 as shown in FIG. 9 also is provided on the vehicle. The signal processing circuit 30 is capable of determining the distance between the source of the supersonic wave which is the vest 61 in this case and the vehicle 1, in accordance with a known method such as LORAN-type method or trans-bonder-type method. The vehicle 1 also carries an alarm circuit 50 including an alarm speaker, and a brake control circuit 60 for controlling the braking system of the vehicle.

Figure 10A:
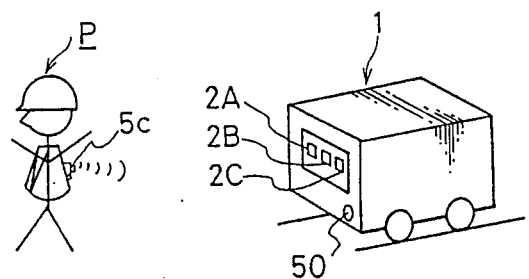
FIGS. 10(1) and 10(2) are illustrations of states of workers working in a working area.
Figure 10B:
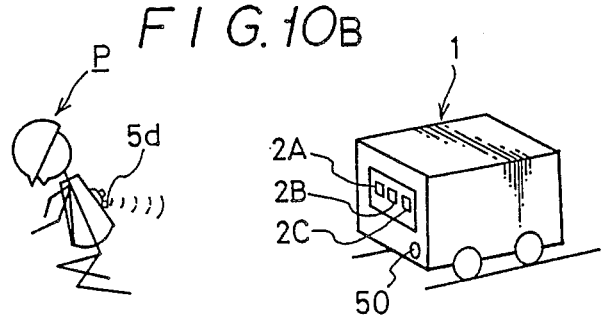

The operation of this second embodiment will be described in detail with reference to FIGS. 10(1) and 10(2).

It is assumed here that the working vehicle has approached the worker P so that the worker has become within a predetermined hazard distance. This fact is detected by the supersonic wave transmitting/receiving device 2 on the working vehicle 1. The device 2 then delivers a signal to the signal processing circuit 30 which in turn produces a signal for activating the alarm circuit 50 thereby informing the worker P of the dangerous approach of the working vehicle. The worker then can recognize the access of the working vehicle so that he can avert the danger. Usually, the workers P are working in various postures as illustrated in FIGS. 10(1) and 10(2). It is to be understood, however, the supersonic wave transmitted from at least one of the plurality of supersonic wave transmitting/receiving units 5a to 5g can reach the supersonic wave transmitting/receiving unit 2 on the vehicle 1, regardless of the posture of the worker P, so that the danger can be avoided without fail.

According to the second embodiment as described, therefore, supersonic waves are continuously transmitted from the vest 61 so that the working vehicle 1 can always receive the supersonic waves from the worker P. Therefore, the alarm circuit 50 is activated and the brake control circuit 60 can operate without fail, whenever the worker P has happened to come into the area of the hazard distance. Thus, each worker can be aware of dangerous acess of the working vehicle by the ultrasonic waves transmitted from himself and alarming and/or the vehicle braking operation can be automatically performed, whereby danger is eliminated without aid of a specific person who watches the states of the vehicle and the workers to find any accidental and dangerous access.

In the second embodiment as described, a plurality of supersonic wave transmitting/receiving units are provided on a single vest. In fact, the second embodiment can employ two or more, more than ten and even several tens of supersonic wave transmitting/receiving units. Since each unit has only a very small weight, and since the total weight of the units is borne by the worker uniformly, the worker can freely work without substantial burden. In addition, since a large number of supersonic wave transmitting/receiving units are carried, the supersonic wave transmitting/receiving device on the vehicle can always receive a supersonic wave or waves from at least one of the supersonic wave transmitting/receiving units on the worker, so that the dangerous access can be detected without fail whenever a worker has happened to come into the hazard area. The signal from the worker can be received without fail even when the supersonic wave transmitting/receiving device 2 on the vehicle has only one of three units 2A, 2B and 2c used in the illustrated second embodiment.

It is also to be noted that the position of each supersonic wave transmitting/receiving unit 5a to 5g on the worker can be adjusted freely by virtue of the provision of the adhesive strap as a variable-position mounting means. For instance, it is possible to mount one or more elements at considerably higher positions so that the supersonic wave emitted therefrom can reach a distal point where the working vehicle exists.

In the second embodiment as described, the supersonic wave transmitting/receiving units 5a to 5g may be substituted by units which are capable of only transmitting supersonic waves. Similarly, the units 2A, 2B and 2C on the vehicle may be units which can only receive supersonic waves.

Figure 8:
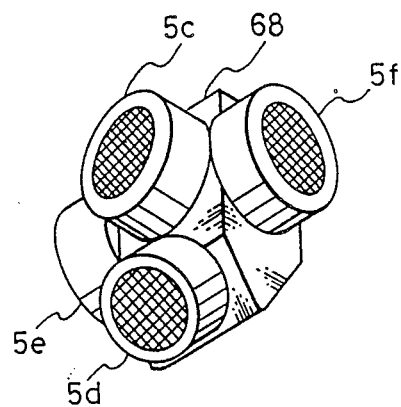
FIG. 8 is a perspective view of a supersonic wave transmitting/receiving unit and a base member thereof, designed to be mounted on the center of the back of a worker.
Figure 11:
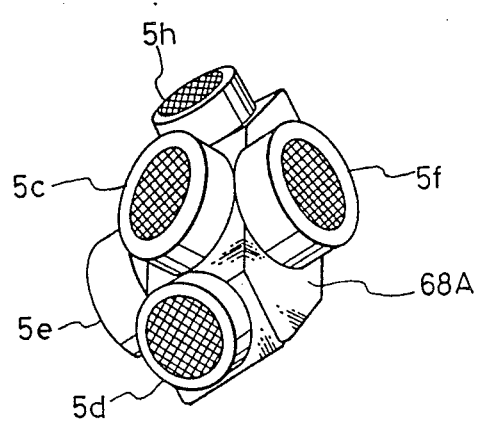
FIG. 11 is a perspective view of another example of the base member.
Figure 12A:
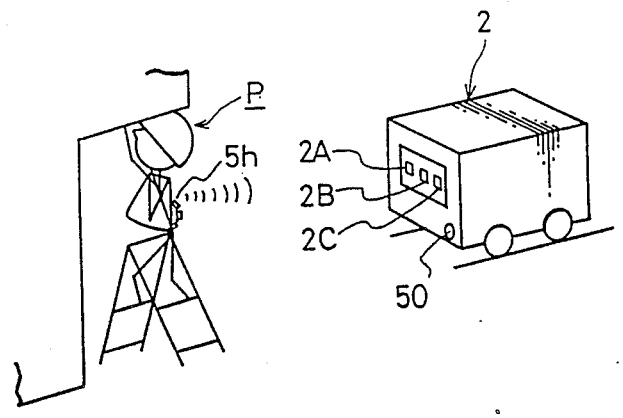
FIGS. 12(1) and 12(2) are illustrations of states of use of the base member shown in FIG. 11.
Figure 12B:
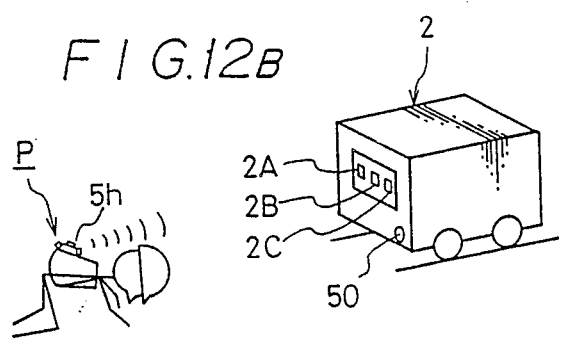

FIG. 11 illustrates a modification of the second embodiment shown in FIG. 8. This modification features an additional supersonic wave transmitting/receiving unit 5h which is directed obliquely upward as viewed in this Figure. Reference numeral 68A denotes the base member. FIGS. 12(1) and 12(2) illustrate the state of use of the embodiment shown in FIG. 11.

A third embodiment of the present invention will be described with reference to FIG. 13.

As in the case of the first embodiment, the third embodiment shown in FIG. 13 has a searching supersonic wave transmitting/receiving device 22 mounted on a working vehicle 1 and capable of transmitting searching supersonic wave or waves, and a response supersonic wave transmitting/receiving device 4 which is capable of transmitting, upon receipt of the searching supersonic wave from the device 2 on the vehicle, a response supersonic wave of a frequency different from the frequency of the searching supersonic wave. In this case, a vest 61 worn by each worker is used as an object to be detected.

The response supersonic wave transmitting/receiving device 4 includes a supersonic wave transmitting/receiving portion 5 composed of a plurality of wide-band supersonic wave transitting/receiving units $5_1$ to $5_n$, a response transmitting/receiving circuit 10 annexed to the supersonic wave transmitting/receiving units $5_1$ to $5_n$, a power supply circuit 63 and a power supply switch 69.

The response transmitting/receiving circuit 10 has an alarm circuit 50A associated with the exciting circuit 12.

Other constituent portions and operation are materially the same as those of the first embodient.

According to this arrangement, since the total weight of the supersonic wave transmitting/receiving units is borne by the entire portion of the worker's body, the embodiment can be carried out practically even when the capacity and the number of the supersonic wave transmitting/receiving units are increased. This also enables the capacity of the driving power supply to be increased, so that an appreciable effect can be produced even for vehicles which have a comparatively high reversing speed.

It will also be understood that this embodiment offers the same advantages as those derived from the preceding embodiments, along with the advantage specifically mentioned above.

A description will be made below as to the manner of mounting of the supersonic wave trasnmitting/receiving units and operation of the same which are commonly applicable both to the second and the third embodiments as described.

Figure 14:
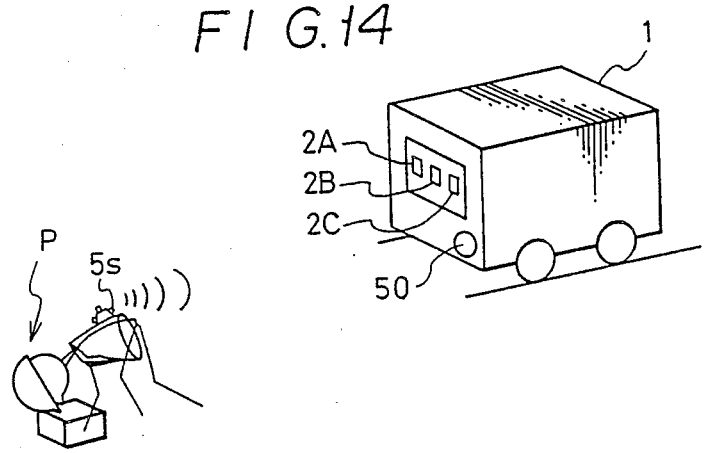
FIG. 14 shows a transmitting/receiving unit mounted on the back of a worker.
Figure 15:
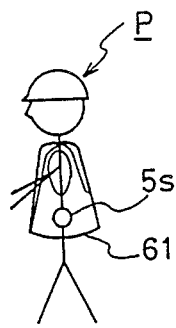
FIGS. 15 and 16 show a transmitting/receiving unit mounted on the side or lower flank of a worker.

FIG. 14 illustrates a case where the supersonic wave transmitting/receiving unit 5S is provided on the back of a vest 61 such that its transmitting/receiving surface is directed downward. Usually, when a worker attempts to carry and lift a heavy article, his head moves downward first and then his hip is raised. When the worker takes such a posture, only the supersonic wave transmitting/receiving unit 5S shown in FIG. 14 can exchange signal with the unit on the vehicle. Thus, the arrangement shown in FIG. 14 is effective when the worker is attempting to lift a heavy article.

Figure 16:
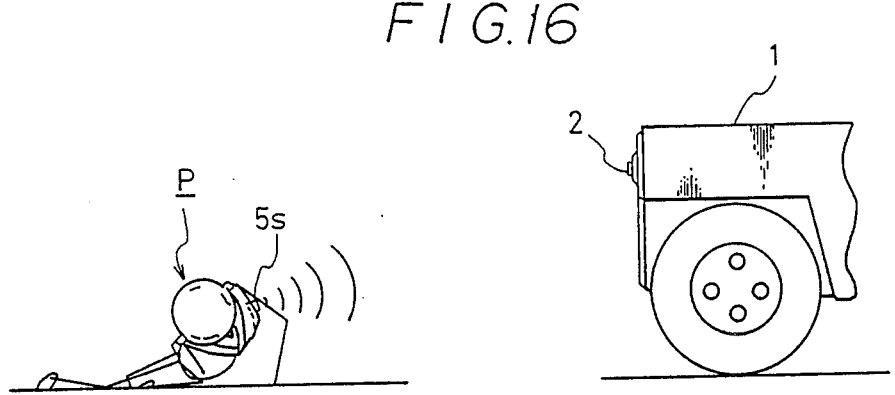

A worker may accidentally fall down and be injured to an extent that he cannot stand up by himself. In such a case, all the supersonic wave transmitting/receiving units 5a to 5h may fail to communicate with the supersonic transmitting/receiving device 2 on the vehicle, although the state of communication depends on the posture of the worker. In such a case, the supersonic wave transmitting/receiving unit 5S on the left or right lower flank may succeed in communicating with the device 2 on the vehicle. This state is illustrated in FIG. 16. Thus, the arrangement shown in FIG. 16 effectively lets the working vehicle 1 recognize the presence of a worker who has fallen down in the hazard area, by virtue of the supersonic wave transmitting/receiving unit 5S provided on each lower flank of the worker.

Figure 17:
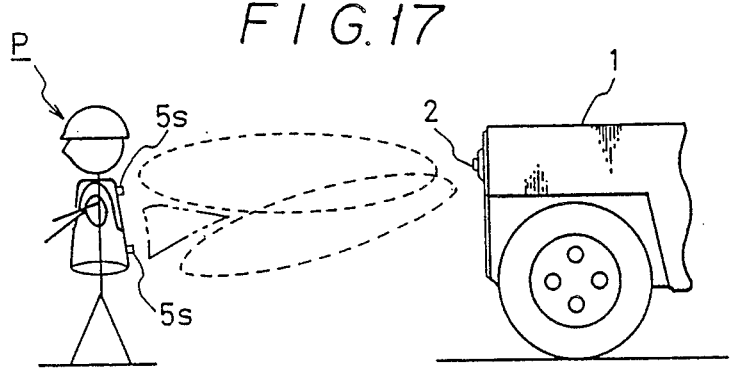
FIG. 17 shows a transmitting/receiving unit mounted on the upper and lower back of a worker.

FIG. 17 illustrates an embodiment in which a supersonic wave transmitting/receiving unit 5S is provided on an upper portion of the back of the vest 61 and on a lower portion of the same. This arrangement can suitably be used in the embodiment shown in FIG. 13. In general, each supersonic wave transmitted from the working vehicle 1 includes a main robe and a side robe. In some cases, a region of an extremely low sensitivity, i.e., so-called dead region, may be caused between the main robe and the side robe, depending on factors such as the frequency of the wave and the shape of the transmitter. It is therefore advisable to set supersonic wave transmitting/receiving units 5S at positions which are outside such dead region, e.g., at upper and lower positions as shown in FIG. 17. With this arrangement, at least one of the supersonic wave transmitting/receiving units on the worker can receive the supersonic wave from the working vehicle 1 without fail, thus accomplishing communication for recognition. The use of a vest 61 as an object is advantageous in that it has a large area and, hence, can carry a large number of supersonic wave transmitting/receiving units without substantial feeling of burden, so as to ensure that the signal exchange between the worker P and the working vehicle 1 is always possible regardless of the posture of the worker P.

A fourth embodiment of the prsent invention will be described with specific reference to FIGS. 18 to 19.

This fourth embodiment features the use of a waist belt 81A in place of the vest used in the second and the third embodiments. Thus, the waist belt 81A carries a plurality of supersonic wave transmitting/receiving units 5a to 5f. The waist belt 81 includes a belt body 81A and a buckle 81B.

Figure 18:
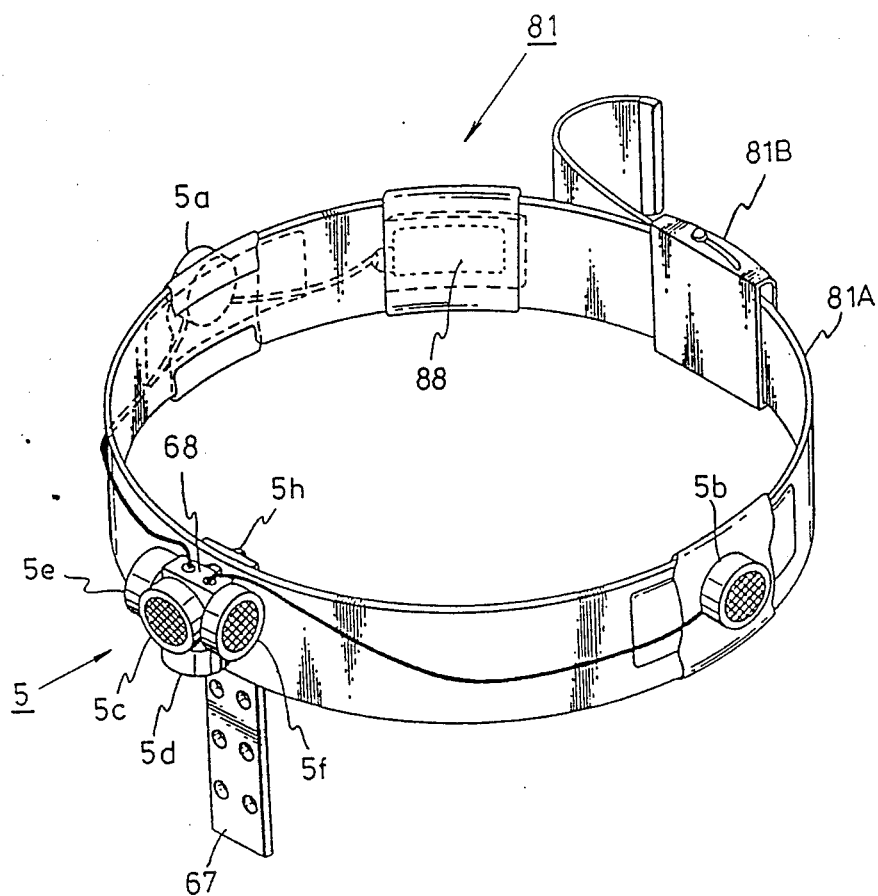
FIG. 18 is a perspective view of a fourth embodiment of the present invention.
Figure 19A:
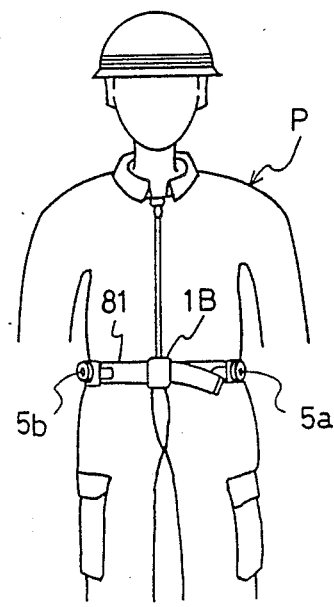
FIGS. 19(1) and 19(2) are illustrations of a warning device put on a worker.
Figure 19B:
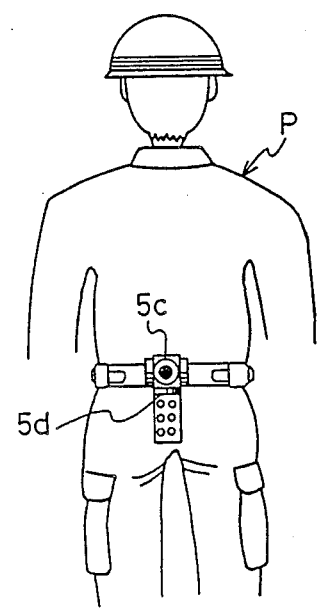
Figure 20A:
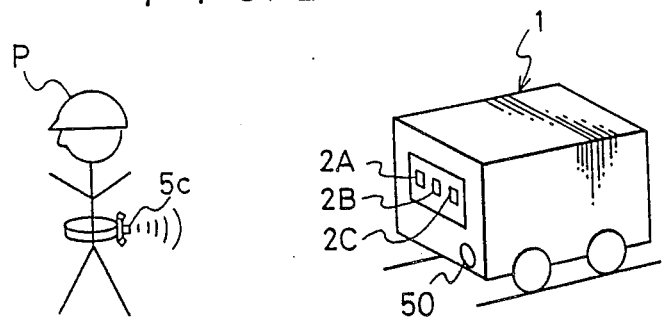
FIGS. 20(1) and 20(2) are illustrations of posture of a worker.
Figure 20B:
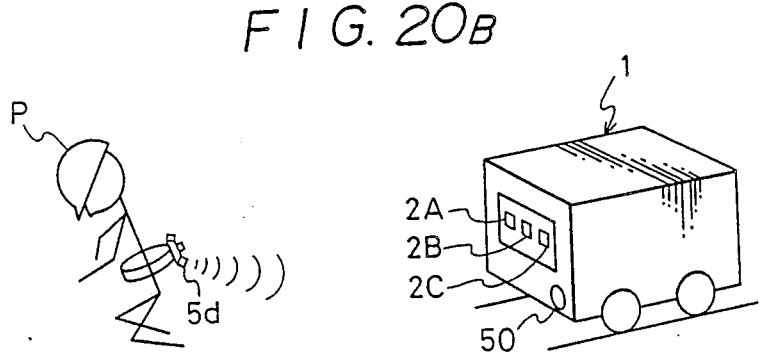

As will be seen from FIG. 18, supersonic wave transmitting/receiving units 5a and 5b are detachably secured to portions of the belt body 18A which are slightly ahead of the lateral sides of the worker P (see FIG. 19(1)) so that they may not be directly contacted by the worker's hand.

The supersonic wave transmitting/receiving units 5c, 5d, 5e and 5f are secured to the back side of the belt body 81A through the intermediary of a base member 68. One 5c of these supersonic wave transmitting/receiving units 5c to 5f is directed rearward, while another unit 5d is directed downward. The remainder two units 5e and 5f are directed to the left and right, respectively. The base member 68 is fixed to the belt body 81A together with the plate 67.

The supersonic wave transmitting/receiving units 5a and 5b are detachably secured by means of adhesive strap as in the preceding embodiments, so that the mounting positions of the supersonic wave transmitting/receiving units 5a and 5b can be varied in accordance with the individual characteristic such as the size of the body of the worker.

The exciting circuit 12 (see FIG. 9) for activating the supersonic wave transmitting/receiving portion 5 and the electrical power supply circuit 63 for the exciting circuit 12 are received together with the power supply switch 69 in a casing 88 which is adapted to be detachably secured to a desired portion of the belt body 81A. FIGS. 19(1) and 19(2) illustrate the described arrangement put on the worker's body. In operation, as the power supply switch 69 is turned on, the exciting circuit 12 is activated so that all the supersonic wave transmitting/receiving units 5a to 5f start to oscillate supersonic waves of predetermined frequencies at once. Other structural features and operation are the same as those in the preceding embodiments.

In the fourth embodient as described, the worker can easily put on and take off the supersonic wave transmitting/receiving units because they are mounted on a waist belt. This enables the worker to move to another place or working area after taking off the belt without difficulty. For instance, the worker can take a rest at break time, without being constrained by the waist belt.

The superonic wave transmitting/receiving units 5a to 5f on the belt body 81A may be substituted by supersonic units which are capable of only transmitting supersonic waves. Similarly, the supersonic wave transmitting/receiving units 2A, 2B and 2C of the supersonic wave transmitting/receiving device 2 on the working vehicle 1 may be substituted by supersonic units which have only the receiving function.

Figure 21A:
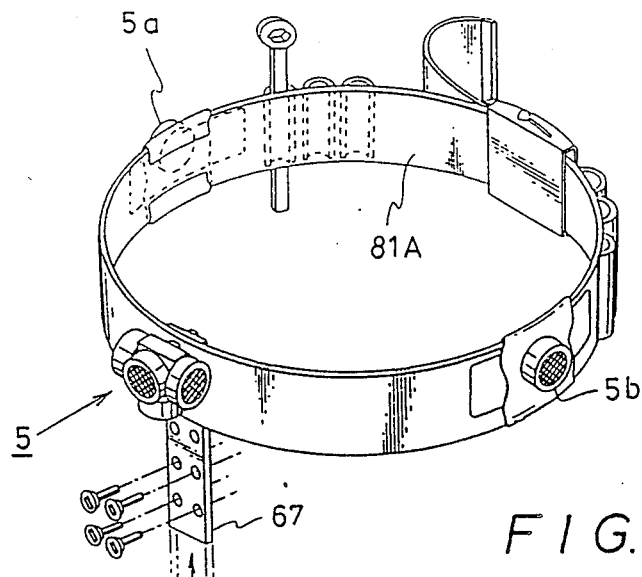
FIGS. 21(1) and 21(2) are illustrations of another example of a container case shown in FIG. 18.
Figure 21B:
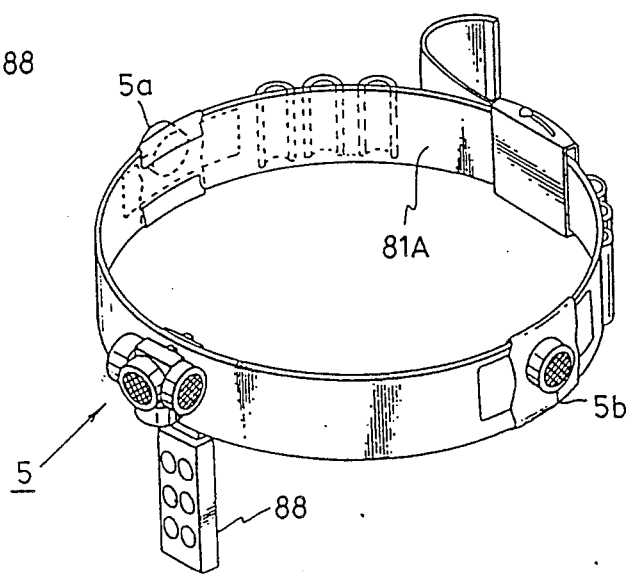

The case 88 may be constructed such that it can be fixed to the plate 67 by means of a screw as illustrated in FIG. 21(1). FIG. 21(2) illustrates the case 88 mounted on the plate 67.

Figure 22A:
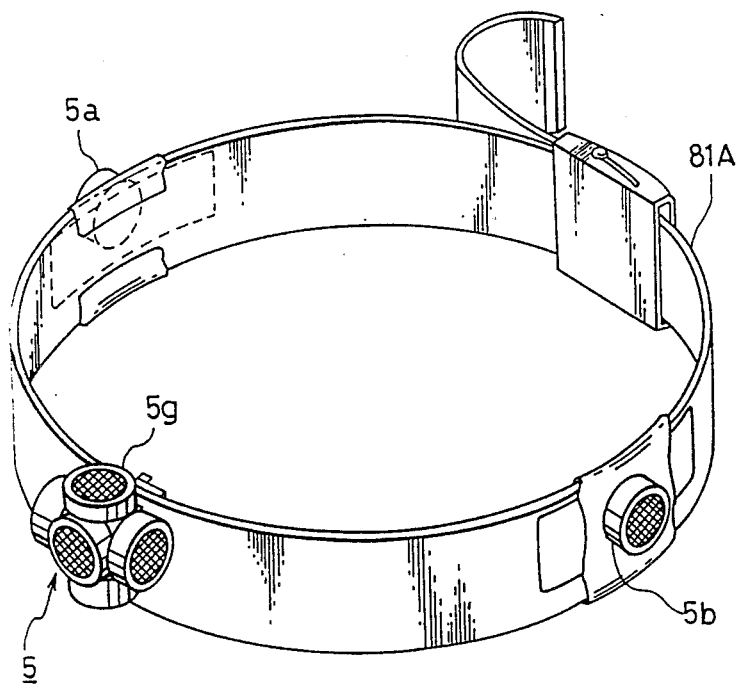
FIG. 22(1) is a perspective view of another example of arrangement around the position where the supersonic wave transmitting/receiving unit of FIG. 18 is installed.
Figure 22B:
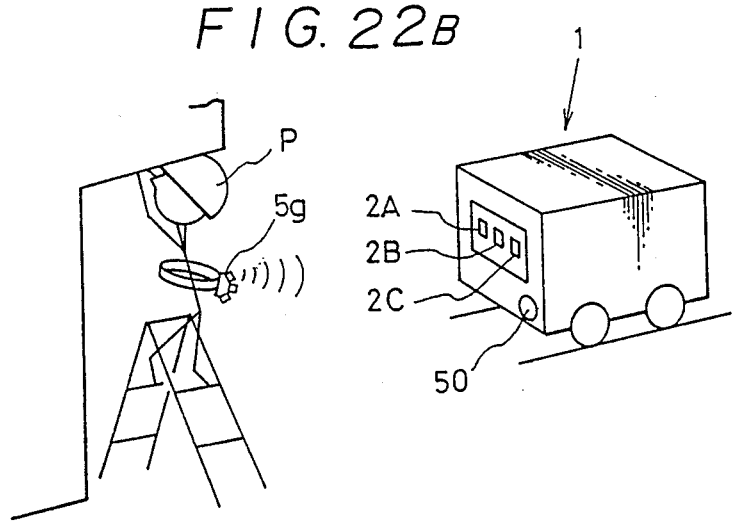

The base member 68 may be constructed such that it has a supersonic wave transmitting/receiving unit 5g which is arranged to direct its wave-output surface upward. Such an arrangement is particularly advantageous in the case where the worker is obliged to take a posture as shown in FIG. 22(2) or to keep a forwardly inclined posture for a long time.

Figure 24:
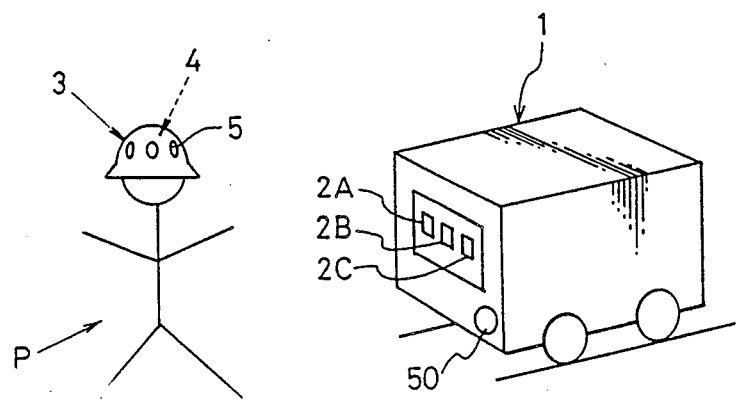

FIGS. 23 and 24 illustrate modifications other than the embodiments described above. In these modifications, supersonic wave transmitting/receiving units 5 are provided on both lateral sides and, as required, on the front side of a helmet 3. The circuit arrangement and operation of these modifications are materially the same as those in the described embodiments.

It will be clear to those skilled in the art that these modifications offer the same advantages as those derived from the embodiments described above. In these modifications, the power supply circuit 63 is adapted to be turned on and off in response to putting on and off of the helmet 3.

As will be fully understood from the foregoing description, according to the present invention, it is possible to accurately detect the relative position between the working vehicle and the worker and to activate an alarm and/or a vehicle braking system, thereby avoiding any danger. Thus, the present invention provides an alarming method and apparatus which ensures a high degree of safety.

What is claimed is:

1. An access alarming method for a working vehicle, comprising:
    transmitting a searching supersonic wave of a first frequency from the working vehicle for searching for an object;
    enabling a searched object to transmit a response supersonic wave of a second frequency upon receipt of the searching supersonic wave;
    receiving the response supersonic wave by receiving means located on the working vehicle and measuring the time required for the supersonic waves to travel between the working vehicle and the object, thereby determining the distance between the vehicle and the object;
    comparing the determined distance with a predetermined distance; and
    activating an alarm circuit when the determined distance is smaller than the predetermined distance, the working vehicle having a single transmitting/receiving means for transmitting the searching supersonic wave and for receiving the response supersonic wave, the object having a single transmitting/receiving means for receiving the searching supersonic wave and transmitting the response supersonic wave.

2. An access alarming method according to claim 1, further comprising operating a brake system of said vehicle simultaneously with the activation of said alarm circuit.

3. An access alarming apparatus, comprising:
    a searching supersonic wave transmitting/receiving means provided on a working vehicle capable of transmitting a searching supersonic wave for searching for an object;
    a response supersonic wave transmitting/receiving means provided on said object that is capable of transmitting, upon receipt of said searching supersonic wave, a response supersonic wave of a frequency that is different from the frequency of said searching supersonic wave;
    a time difference detection circuit provided on said vehicle that is capable of determining the time corresponding to the distance between said working vehicle and said object on the basis of said response supersonic wave transmitted by said response supersonic wave transmitting/receiving means;
    a signal processing circuit provided on said vehicle that is capable of producing an alarm activating signal when the output from said time difference detection circuit is smaller than a predetermined reference value; and
    means for activating an external device in accordance with the output from said signal processing circuit, wherein said working vehicle has a single transmitting/receiving means for transmitting said searching supersonic wave and for receiving said response supersonic wave, said object having a single transmitting/receiving means for receiving said searching wave and transmitting said response supersonic wave.

4. An access alarming apparatus according to claim 3, wherein said searching supersonic wave transmitting/receiving means includes a pair of supersonic transmitting/receiving units which are disposed at the same height leaving a predetermined distance therebetween.

5. An access alarming appaatus according to claim 3, wherein said searching supersonic wave transmitting/receiving means includes three supersonic transmitting/receiving units which are arranged at a predetermined interval substantially at the same height.

6. An access alarming apparatus according to claim 3, wherein said searching supersonic wave transmitting/receiving means includes three supersonic wave transmitting/receiving units which are arranged at a predetermined interval, wherein two supersonic transmitting/receiving units on outer sides are oriented such that their axes are directed slightly inwardly.

7. An access alarming apparatus according to claim 3, wherein said object is an article worn by a worker such as a helmet.

8. An access alarming apparatus for a working vehicle according to claim 3, further comprising:
   a plurality of supersonic wave transmitting/receiving units provided on a back side of an article worn by a worker; and
   an exciting circuit which is capable of activating said supersonic transmitting/receiving units at a predetermined frequency.

9. An access alarming apparatus according to claim 8, wherein said supersonic transmitting/receiving units are mounted through the intermediary of a variable-position mounting means.

10. An access alarming apparatus according to claim 8, further comprising an automatic change-over means provided between said supersonic wave transmitting-/receiving units and said exciting circuit, said automatic change-over means being adapted to normally set said supersonic wave transmitting/receiving means in receiving mode and to automatically change-over said supersonic wave transmitting/receiving means into transmitting mode upon receipt of an externally supplied signal of a predetermined frequency.

11. An access alarming apparatus according to claim 10, further comprising an oscillation circuit that includes an alarm circuit capable of operating concurrently with said exciting circuit.

12. An access alarming apparatus according to claim 8, wherein said article is a vest worn by a worker.

13. An access alarming apparatus according to claim 8, wherein said article is a waist belt worn by a worker.

14. An access alarming apparatus according to claim 13, wherein at least one of said supersonic wave transmitting/receiving unit is disposed such that its wave output surface is directed rearward when said worker is in the upright posture, while at least one from the remainder supersonic wave transmitting/receiving units is disposed such that its wave output surface is directed downward when said worker is in the upright posture.

15. An access alarming apparatus according to claim 13, wherein said supersonic wave transmitting/receiving elements are provided on lateral side portions of said waist belt on said worker.

16. An access alarming apparatus according to claim 13, further comprising an automatic change-over means provided between said supersonic wave transmitting-/receiving units and said exciting circuit, said automatic change-over means being adapted to normally set said supersonic wave transmitting/receiving means in receiving mode and to automatically change-over said supersonic wave transmitting/receiving means into transmitting mode upon receipt of an externally supplied signal of a predetermined frequency.

17. An access alarming apparatus according to claim 13, wherein said exciting circuit has a function for outputting an exciting signal of a frequency different from the frequency of the received supersonic wave, thereby to excite said supersonic transmitting/receiving units.

18. An access alarming appaatus according to claim 8, wherein said article is a helmet worn by a worker.

19. The apparatus of claim 3, wherein said external device comprises an alarm.

* * * * *

UNITED STATES PATENT AND TRADEMARK OFFICE
CERTIFICATE OF CORRECTION

PATENT NO. : 4,937,795
DATED : June 26, 1990
INVENTOR(S) : R. MOTEGI et al.

Page 1 of 2

It is certified that error appears in the above-indentified patent and that said Letters Patent is hereby corrected as shown below:

```
    At column 1, line 14, before "alarm" insert ---an---.
    At column 2, line 58, change "10(1)" to ---10A---.
    At column 2, line 58, change "10(2)" to ---10B---.
    At column 2, line 62, change "12(1)" to ---12A---.
    At column 2, line 62, change "12(2)" to ---12B---.
    At column 3, line 5, change "19(1)" to ---19A---.
    At column 3, line 5, change "19(2)" to ---19B---.
    At column 3, line 7, change "20(1)" to ---20A---.
    At column 3, line 7, change "20(2)" to ---20B---.
    At column 3, line 9, change "21(1)" to ---21A---.
    At column 3, line 9, change "21(2)" to ---21B---.
    At column 3, line 11, change "22(1)" to ---22A---.
    At column 3, line 15, change "22(2)" to ---22B---.
    At column 3, line 16, change "22(1)" to ---22A---.
    At column 3, lines 32 and 33, change "trasnmitting/receiving" to ---
transmitting/receiving---.
    At column 3, line 68, change "2" to ---5---.
    At column 4, line 1, change "difeent" to ---different---.
    At column 4, line 22, change "ampllifier" to ---amplifier---.
    At    column    5,    line    29,    change    "transmitting"    to    ---
transmitting/receiving---.
    At column 7, line 60, change "10(1)" to ---10A---.
    At column 7, line 61, change "10(2)" to ---10B---.
    At column 8, line 5, change "10(1)" to ---10A---.
    At column 8, line 6, change "10(2)" to ---10B---.
    At column 8, line 21, change "acess" to ---access---.
    At column 8, line 47, change "2c" to ---2C---.
    At column 8, line 67, change "12(1)" to ---12A---.
    At column 8, line 67, change "12(2)" to ---12B---.
    At column 9, line 5, change "22" to ---2---.
```

UNITED STATES PATENT AND TRADEMARK OFFICE
CERTIFICATE OF CORRECTION

PATENT NO. : 4,937,795
DATED : June 26, 1990
INVENTOR(S) : R. MOTEGI et al.

It is certified that error appears in the above-indentified patent and that said Letters Patent is hereby corrected as shown below:

At column 9, line 18, change "transitting" to ---transmitting---.
At column 9, lines 43 and 44, change "trasnmitting" to ---transmitting---.
At column 10, line 31, change "prsent" to ---present---.
At column 10, line 34, change "81A" to ---81---.
At column 10, line 35, change "81A" to ---81---.
At column 10, line 41, change "18A" to ---81A---.
At column 10, line 43, change "19(1)" to ---19A---.
At column 10, line 48, after "one" add ---unit---.
At column 10, line 63, after "for" insert ---driving---.
At column 10, line 67, change "19(1)" to ---19A---.
At column 10, line 67, change "19(2)" to ---19B---.
At column 11, line 24, change "21(1)" to ---21A---.
At column 11, line 24, change "21(2)" to ---21B---.
At column 11, line 31, change "22(2)" to ---22B---.
At column 14, line 3, (claim 14, line 3), change "unit" to ---units---.
At column 14, line 29, (claim 18, line 1), change "appaatus" to ---apparatus---.

Signed and Sealed this

Thirtieth Day of May, 1995

BRUCE LEHMAN

*Attest:*

*Attesting Officer*         *Commissioner of Patents and Trademarks*

UNITED STATES PATENT AND TRADEMARK OFFICE
CERTIFICATE OF CORRECTION

PATENT NO. : 4,937,795
DATED : June 26, 1990
INVENTOR(S) : R. Motegi, et al

It is certified that error appears in the above-indentified patent and that said Letters Patent is hereby corrected as shown below:

On the title page: Item[73] Assignee add --Nippon Hodo Co., Ltd., Tokyo, Japan --.

Signed and Sealed this

Eighteenth Day of July, 1995

*Attest:*

BRUCE LEHMAN

*Attesting Officer*   *Commissioner of Patents and Trademarks*